Sept. 10, 1968    E. T. PHILLIPS    3,401,388
CLOSURE-RATE DETERMINING RADAR SYSTEM
Filed Dec. 27, 1966    2 Sheets-Sheet 1

INVENTOR.
EDWARD T. PHILLIPS
BY Carl R. Brown
Attorney

Sept. 10, 1968  E. T. PHILLIPS  3,401,388
CLOSURE-RATE DETERMINING RADAR SYSTEM
Filed Dec. 27, 1966  2 Sheets-Sheet 2

INVENTOR.
EDWARD T. PHILLIPS
BY Carl R. Brown
attorney

United States Patent Office 3,401,388
Patented Sept. 10, 1968

3,401,388
CLOSURE-RATE DETERMINING
RADAR SYSTEM
Edward T. Phillips, San Diego, Calif., assignor to Ryan
Aeronautical Co., San Diego, Calif.
Filed Dec. 27, 1966, Ser. No. 604,694
4 Claims. (Cl. 343—8)

ABSTRACT OF THE DISCLOSURE

This invention relates to the use of a low power, broad beam, radar transmitter-receiver unit for determining the component of closure-rate of an object, such as an aircraft, toward and perpendicular to, a smooth surface, such as a landing area. The unit receives the specular portion of the reflected energy from the surface and produces a Doppler signal that is processed to provide the desired perpendicular component of closure-rate information.

Background of the invention

A need exists for a system to determine the perpendicular component of the closure-rate between an object and a smooth surface. A system for determining this component of the closure-rate or the sink-rate between a moving aircraft and a landing surface satisfies a particular need since repeated hard landings accelerate the aging of an airframe.

In the operation of high performance and heavy aircraft, it has been determined that repeated hard landings can cause fatigue and even structural damage that my not be determined by a normal inspection and yet can cause an accident or crash if not corrected. It is therefore desirable to monitor and maintain a record of landing stresses of individual aircraft, which record can indicate the possibility of structural damage or fatigue. Any aircraft exceeding a predetermined amount of cumulative stress can then be inspected and any damage caused can be detected. This monitoring is advantageous with any aircraft, but is especially applicable to naval aircraft engaged in carrier landings, where the landing shock is often much greater than that experienced on a normal airfield. Since landing shock is directly related to the rate of descent of the aircraft immediately before impact, measurement of the sink-rate during the last few feet of descent will provide the necessary data.

Because of relative forward movement between the aircraft and the landing surface, the sink-rate of interest is that closure-rate of the aircraft perpendicular with the landing surface. Determining the sink-rate of interest thus presents possible problems of changing the direction of a narrow radar beam to reflect changes in the perpendicular relationship between the aircraft and the landing surface. To transmit a narrow radar beam requires a rather large antenna that creates weight and location problems when mounted on an aircraft.

Summary of the invention

The radar system of my invention measures the perpendicular component of the closure-rate or sink-rate as a result of Doppler shift in a radar signal reflected from the object or the landing surface. The system has low power and operates within the very specific limits for the particular situation. The unit is compact, completely self-contained and when used on aircraft is independent of the pilot or aircraft services. As previously stated, with normal Doppler velocity sensing techniques a very narrow radar beam is necessary for accuracy and, at the desirable range of frequencies involved, a large antenna is required to obtain a narrow beam.

The subject system reflects a beam from a surface that is smooth relative to the wavelength of the transmitted beam. This causes a portion of the energy reflected to the receiver antenna to be specular, which narrows the effective beam width from the transmitter to the receiver, thereby allowing use of a relatively small antenna. The reflected specular energy is perpendicular to the smooth surface and thus, the indicated closure-rate or sink-rate is that component of aircraft velocity that is at right angles to the surface, deck or runway. This is the component of reflected energy that is of primary interest in determining the perpendicular component of closure-rate or sink-rate and this component cannot be measured with a narrow beam fixed radar antenna or a space-stabilized antenna, when, for example, an aircraft is landing on a non-stabilized surface such as an aircraft carrier deck.

To improve spectral energy reception, the transmitter and receiver antennas are circularly polarized in the opposite sense so that the single bounce specularly reflected energy is fully accepted by the receiver antenna and diffuse reflection is partly rejected because it is depolarized. Thus the circularly polarized antennas enhance the accuracy of the system by providing further rejection of the non-specular energy.

The receiver provides an output signal, having a Doppler shift in the frequency of the received energy, that is fed to a computer of known design. The computer output may be displayed or recorded on the moving object, such as an aircraft. Alternatively the Doppler shift receiver output signal can be transmitted, by telemetry, to apparatus in the immediate vicinity, which apparatus has a computer for providing an indication of the closure-rate or sink-rate directly from the Doppler shift signal for display or recording in any suitable form as a permanent record. Thus should an aircraft crash on landing, the final sink-rate data will be recorded an may be useful in determining the cause of the crash. This avoids the necessity, where desirable, for carrying recording apparatus in the aircraft, or protecting an airborne unit against crash damage.

A typical system and its operation are illustrated in the drawings, in which.

Similar characters of reference indicate similar or identical elements and portions throughout the specification and throughout the views of the drawing.

Figure 1:
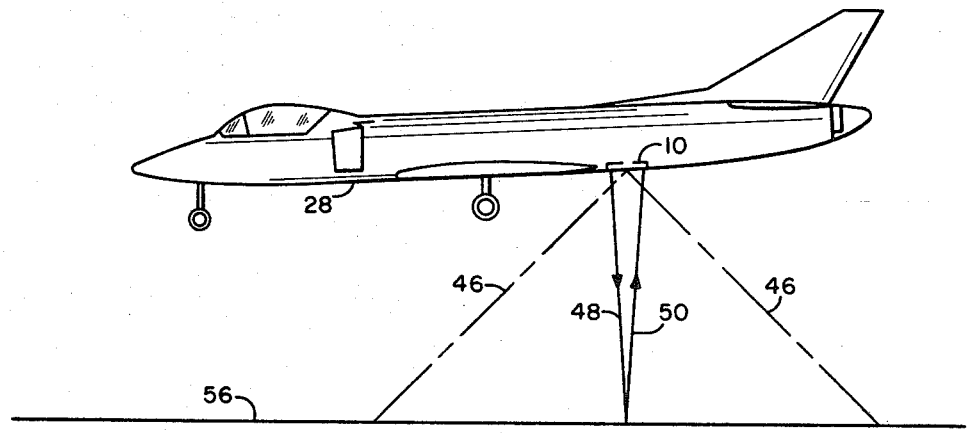
FIGURE 1 is a diagram of an aircraft in landing approach, showing the radar beam configuration.
Figure 2:
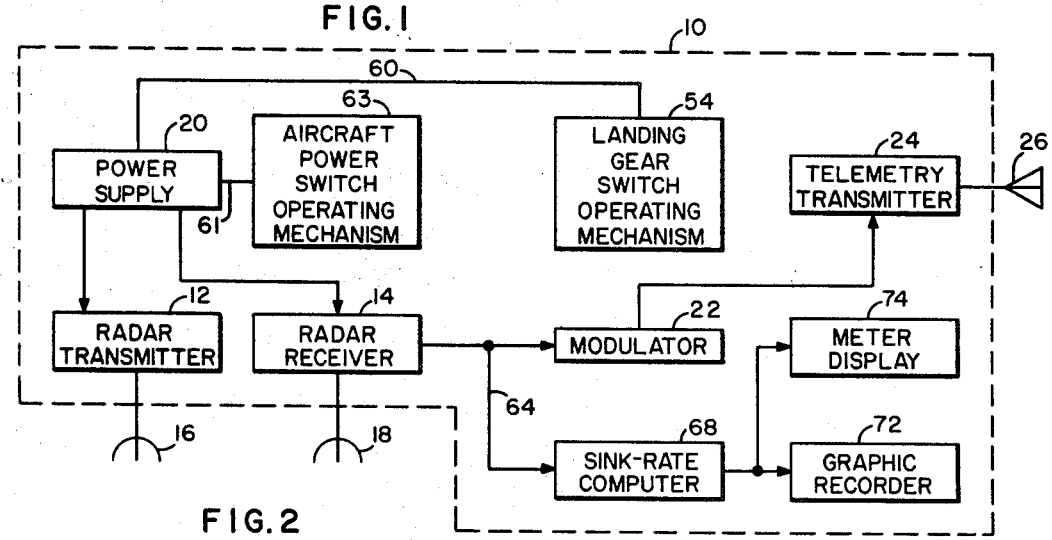
FIGURE 2 is a block diagram of the airborne unit.
Figure 3:
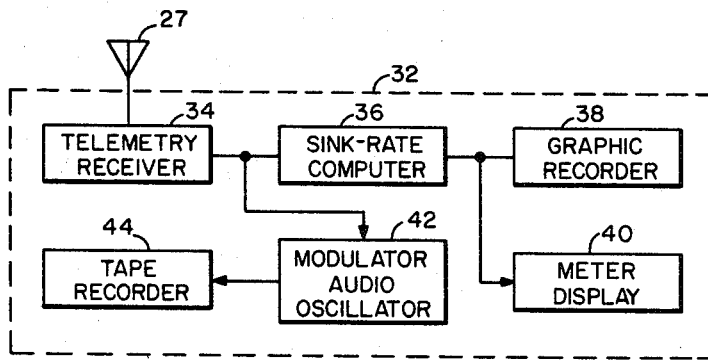
FIGURE 3 is a block diagram of the ground based apparatus.

The airborne unit 10 contains a radar transmitter 12 and a radar receiver 14, with their respective antennas 16 and 18 and a power supply 20. A signal from transmitter 12 is reflected from a surface and detected by the receiver 14, which provides an output signal corresponding to the Doppler shift of the reflected signal. This type of radar apparatus is well known and the basic circuitry is known and can vary considerably.

The Doppler output signal is fed through a modulator 22 to a telemetry transmitter 24 having an antenna 26, all of conventional type, so that the only output from the airborne unit is a Doppler shift signal. The Doppler output signal is also fed through line 64 to a sink-rate computer 68, which is a conventional type circuit used with Doppler radar to convert the Doppler shift signal to a velocity component. The resultant vertical velocity signal is applied to any suitable graphic recorder 72 in which it can be recorded with respect to time, as on a controlled moving graph, to provide a complete record of sink-rate over the flight path of interest. Sink-rate may also be read directly on a meter display 74 for monitoring purposes if required. A switching means (not shown) may be placed in the line to the modulator 22 and the sink-rate computer 68 to shut off either system as desired. The airborne system 10 may be energized in normal use upon lowering the landing gear. This automatically actuates a landing gear switch operating mechanism 54 that sends a switch or relay controlling signal through line 60 to energize the power supply 20. The system 10 would then be de-energized upon turning off the aircraft power through the aircraft power switch operating mechanism 63 that feeds a shut off signal through line 61 to de-energize the power supply 20. Airborne unit 10 can be mounted in an aircraft 28 internally with the antennas exposed at the skin surface and directed downwardly, or the unit may be carried externally in a fairing or a pod.

Figure 4:
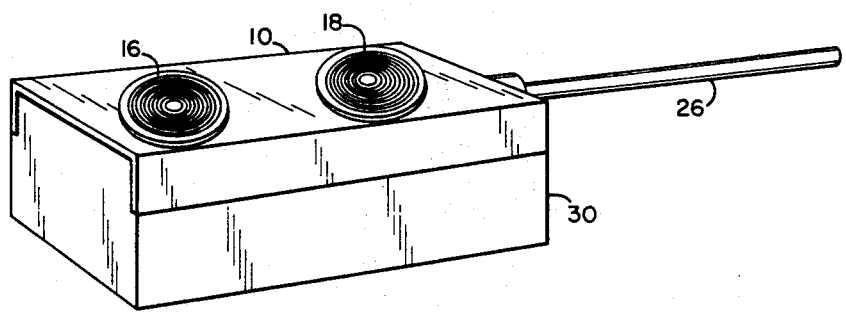
FIGURE 4 is a perspective view of a typical airborne unit.

A typical configuration of the airborne unit is shown in FIGURE 4, with the entire circuitry contained in a casing 30 having polarized antennas 16 and 18 on one face and the telemetry antenna 26 being a whip type extending from one end. While many different arrangements and circuits could be used, the unit tested, as an example, contained solid state circuitry and was approximately the size of a one pint milk carton and weighed less than three pounds, including batteries sufficient for six hours of continuous operation. The small size and low weight make this type of unit adaptable even to light aircraft. Effective range of sensitivity was from zero to about sixty feet and the unit was capable of registering undulations of the aircraft caused by taxying over irregularities on a runway.

The ground based unit 32 includes a telemetry receiver 34 connected to a sink-rate computer 36, which latter may be a conventional type circuit used with Doppler radar to convert the Doppler shift signal to a velocity component. The resultant vertical velocity signal is applied to any suitable graphic recorder 38 in which it can be recorded with respect to time, as on a controlled moving graph, to provide a complete record of sink-rate over the flight path of interest. Individual aircraft identification can easily be marked on the recording at the time of landing, making the recording an actual log for the aircraft. Sink-rate may also be read directly on a meter 40 for monitoring purposes if required. An additional record may be kept of the Doppler shift signal itself by feeding the telemetry receiver output through a modulated audio oscillator 42 to a tape recorder 44, although this is not essential to the operation of the system.

The telemetry transmitter 24 need have a range of only about half a mile for aircraft carrier landings and about a mile even for a large airport, where the ground based unit might be in the control tower or in an installation adjacent the approach path. The length and nature of the antenna 26 are thus not critical and may be arranged to suit the aircraft.

Figure 5:
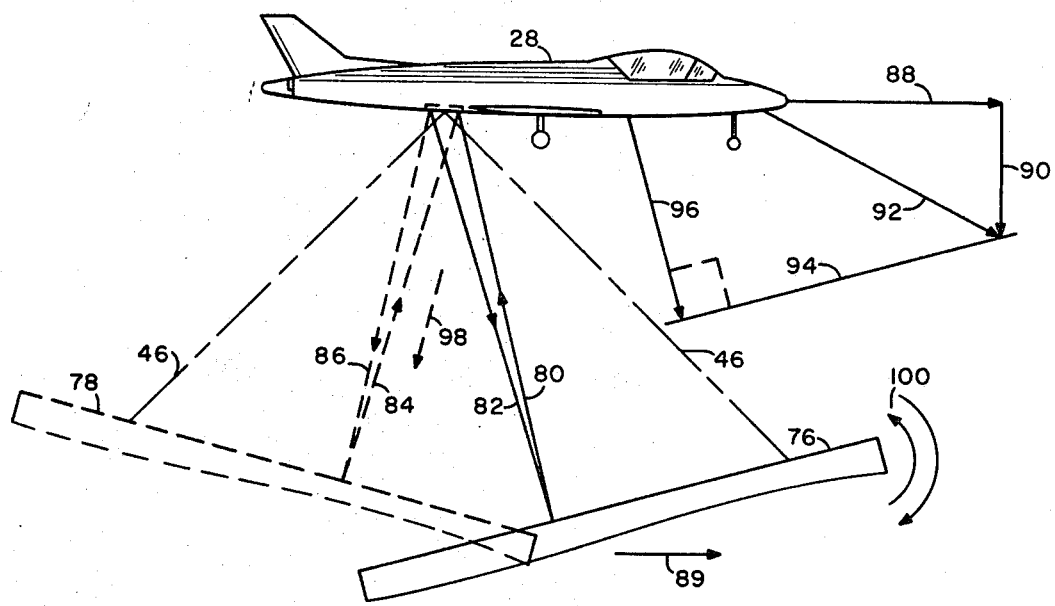
FIGURE 5 is a diagram of an aircraft illustrating the radar beam configuration and the reflected spectral energy from a non-stable landing surface.

As illustrated in FIGURES 1 and 5, the transmitted radar beam 46 is a wide beam allowing the use of a small antenna. The beam radiated is thus sufficiently wide to provide a reflection back to the receiver 10 that is perpendicular to the surfaces 56, 78 and 76. Only the portion of the reflection perpendicular to the surfaces 56, 78 and 76 is of importance, since this provides the specular reflection 50, 80 and 86 to the receiver antenna 18. Specular reflection only occurs in a direction perpendicular to a relatively smooth surface. A relatively smooth surface is one having a roughness factor in the order of fractions of inches, or of smaller lengths than the wavelength of transmitted beam. Generally the transmitted beam will be in the S band range and will have a wavelength of approximately four (4) inches. The roughness factor, for example, of airport surfaces and aircraft carrier decks is much smaller than four (4) inches. Where the sink-rate to a rougher surface is to be determined, then a lower transmitter frequency can be used.

To determine the sink-rate of an aircraft toward a non-stable surface such as an aircraft carrier deck, it is necessary to determine the velocity of the aircraft relative to the moving and often pitching carrier deck. As illustrated in FIGURE 5, the carrier deck 76 may pitch clockwise or counter clockwise relative to the aircraft 28 in directions illustrated by arrows 100. Thus the carrier deck 76 in extreme pitching conditions may move to the position of the portion of the deck 78 illustrated in phantom. The carrier deck may also roll in the same manner. The carrier deck would normally be moving forward in the direction of arrow 89 while the aircraft is moving forward with a velocity represented by arrow 88. Since the aircraft 28 is in its landing approach on the carrier deck 76, it is also sinking in a vertical direction with a velocity represented by arrow 90. Thus the glide path of the aircraft is generally in the direction of arrow 92 with a velocity corresponding to the combined velocity components 88 and 90. The sink-rate to be determined however is the sink-rate between the aircraft and the carrier deck, which sink-rate can be changed without change in the descent velocity of the aircraft per se because of a change in the vertical or horizontal velocity of the moving carrier deck. Thus to determine the sink-rate of interest, it is necessary to determine the descent of the aircraft relative to a plane 94 that is horizontal with the surface of the carrier deck 76. This requires that the transmitted signal 82 causing the reflected signal 80 to be perpendicular to the surface of the carrier deck, which is satisfied by the reflected spectral energy. Accordingly the Doppler shift in the reflected energy 80 gives the velocity of the sink-rate of interest along arrow 96 when the carrier deck 76 is in the position illustrated and the Doppler shift in the reflected energy 84 gives the velocity of the sink-rate of interest along arrow 98 when the carrier deck 78 is in the position illustrated in phantom.

The backscatter from the major portion of the beam will not be of sufficient strength to affect the receiver 14, which is tuned to respond only to the specular reflection, giving the effect of a very narrow beam that is instantly redirected upon changes in the position of the surface without the physical means for accomplishing this.

The transmitter 16 and the receiver 18 antennas are circularly polarized in the opposite sense, so that the single-bounce specularly reflected energy is fully accepted by the receiver antenna 18. Thus if the transmitter antenna 16 transmits a beam with clockwise circular polarization, then the receiver antenna 18 receives reflected energy with a counter clockwise circular polarization. The single-bounce specularly reflected energy has a reverse polarization from the transmitted beam. Diffuse reflection is partially rejected because it is depolarized. For example, reflected energy at a slight angle to the specular return has an elliptical polarization that is partially rejected by the polarized receiver antenna. The use of the circularly polarized antennas further enhances the accuracy of the system by providing further rejection of the non-specular energy. It is also necessary to place the transmitter 16 and receiver 18 antennas as close together as possible and in the same location, since the spectral return is perpendicular.

In operation, the airborne radar unit is energized upon lowering the landing gear by landing gear switch operating mechanism 54 feeding an energizing signal through line 60 to the power supply 20. As soon as the aircraft 28 descends to within the limit of sensitivity of the radar, about 60 feet being a suitable range, the receiver will provide an output signal that will be computed on the aircraft by sink-rate computer 68 and recorded by graphic recorder 72 and displayed to the pilot on meter display 74. The receiver output signal will also be modulated by modulator 22 and transmitted to the ground unit 32 by telemetry transmitter 24 and antenna 26. Upon landing the aircraft power is turned off actuating the airccraft power switch operating mechanism 63 that feeds a de-energizing signal through line 61 to the power supply 20.

The system is compatible with existing electronic and radar apparatus and will not cause interference, due to the low power and the independence of the airborne unit from the aircraft services. On an aircraft carrier where aircraft are landing in rapid succession, the airborne unit could be turned off by the deck crew in the course of their normal handling to avoid overlap of signals from different aircraft. On an airport each aircraft would normally taxi out of telemetry range of the ground unit before the next aircraft lands.

It is understood that minor variation from the form of the invention disclosed herein may be made without departure from the spirit and scope of the invention, and that the specification and drawing are to be considered as merely illustrative rather than limiting.

I claim:

1. A closure-rate determining radar system comprising,
    radar transmitter means for transmitting a radar beam from a moving object to a surface,
    radar receiver means for substantially only accepting received specular return energy reflected from said surface and providing Doppler output signals,
    said transmitter means and said receiver means having circular polarized antenna means for transmitting a radar beam having circular polarization opposite to that circular polarized energy capable of being accepted by said receiver means,
    and closure-rate computer means responsive to said Doppler output signals for providing output information giving the rate of closure between said object and said surface in a direction perpendicular to said surface.

2. A sink-rate determining radar system for aircraft comprising,
    continuous wave radar transmitting means for transmitting a radar beam from a forward moving aircraft to a substantially smooth surface,
    radar receiver means for receiving and reflected energy from said beam and providing Doppler shifted output signals,
    said transmitter means and said receiver means having circular polarized antenna means for transmitting a radar beam having circular polarization opopsite to that circular polarized energy capable of being accepted by said receiver means,
    and closure-rate computer means responsive to said output signals for determining the vertical velocity of said aircraft.

3. A sink-rate determining system for aircraft as claimed in claim 2 in which,
    said sink-rate computer means is ground based,
    telemetry transmitting means in said aircraft for transmitting said Doppler output signals,
    and ground based telemetry receiving means for receiving and supplying said Doppler output signals to said sink-rate computer means.

4. A sink-rate determining radar system for aircraft as claimed in claim 2 in which,
    said sink-rate computer means is positioned on said aircraft.

References Cited
UNITED STATES PATENTS

| | | | |
|---|---|---|---|
| 2,640,915 | 6/1953 | Sichak | 343—100.3 |
| 2,710,959 | 6/1955 | Pierce | 343—12 |
| 2,923,932 | 2/1960 | Stavis et al. | 343—8 |
| 2,949,603 | 8/1960 | Logue | 343—9 |
| 2,976,534 | 3/1961 | Kampinsky | 343—100.3 |
| 3,216,009 | 10/1965 | Thomason | 343—12 |

RODNEY D. BENNETT, *Primary Examiner.*

J. G. BAXTER, *Assistant Examiner.*